United States Patent
Cui et al.

(10) Patent No.: US 12,309,653 B2
(45) Date of Patent: May 20, 2025

(54) MEASUREMENT GAP SHARING FOR L1/L2 BASED MOBILITY AND L3 BASED MOBILITY

(71) Applicant: Apple Inc., Cupertino, CA (US)

(72) Inventors: Jie Cui, San Jose, CA (US); Qiming Li, Beijing (CN); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Xiang Chen, Campbell, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,683

(22) PCT Filed: May 11, 2021

(86) PCT No.: PCT/CN2021/093115
§ 371 (c)(1),
(2) Date: May 5, 2022

(87) PCT Pub. No.: WO2022/236701
PCT Pub. Date: Nov. 17, 2022

(65) Prior Publication Data
US 2024/0163752 A1    May 16, 2024

(51) Int. Cl.
*H04W 36/00* (2009.01)
*H04W 36/06* (2009.01)

(52) U.S. Cl.
CPC ... *H04W 36/0088* (2013.01); *H04W 36/0055* (2013.01); *H04W 36/06* (2013.01)

(58) Field of Classification Search
CPC ......... H04W 36/0088; H04W 36/0055; H04W 36/06
See application file for complete search history.

(56) References Cited

U.S. PATENT DOCUMENTS

2016/0227571 A1* 8/2016 Baek .................. H04W 52/0206
2017/0127305 A1* 5/2017 Dev ...................... H04W 24/10
(Continued)

FOREIGN PATENT DOCUMENTS

| CN | 111434140 | 7/2020 |
| WO | 2020/248261 | 12/2020 |

OTHER PUBLICATIONS

Huawei et al., "Further discussion on gap sharing" 3GPP TSG-RAN WG4 Meeting AH-1807 LTE/NR perf, R4-1809015, Jul. 6, 2018, 4 sheets.

*Primary Examiner* — Fahmida S Chowdhury
(74) *Attorney, Agent, or Firm* — Fay Kaplun & Marcin, LLP

(57) ABSTRACT

A user equipment (UE) is configured to perform layer 1 (L1), layer 2 (L2) and layer (3) mobility operations. The UE determines a measurement gap sharing scheme for layer 1 (L1)/layer 2 (L2) based mobility and layer 3 (L3) based mobility, determines a measurement gap pattern, wherein at least one measurement gap includes L1/L2 measurement occasions and L3 measurement occasions and collects measurement data during the at least one measurement gap in accordance with the measurement gap sharing scheme.

20 Claims, 9 Drawing Sheets

(56) References Cited

U.S. PATENT DOCUMENTS

| | | | |
|---|---|---|---|
| 2017/0150386 A1* | 5/2017 | Hoover | H04W 36/0088 |
| 2018/0302779 A1* | 10/2018 | Fujishiro | H04W 72/23 |
| 2019/0021017 A1* | 1/2019 | Nagaraja | H04W 72/51 |
| 2019/0053082 A1* | 2/2019 | Alriksson | H04W 48/08 |
| 2019/0090151 A1* | 3/2019 | Yiu | H04W 36/0069 |
| 2019/0097877 A1* | 3/2019 | Yiu | H04W 72/0453 |
| 2019/0182900 A1* | 6/2019 | Cui | H04W 56/001 |
| 2019/0274146 A1* | 9/2019 | Tang | H04W 24/08 |
| 2019/0306734 A1* | 10/2019 | Huang | H04W 24/08 |
| 2019/0394834 A1* | 12/2019 | Cui | H04W 24/10 |
| 2020/0314788 A1* | 10/2020 | Yu | H04W 56/0065 |
| 2021/0006995 A1* | 1/2021 | Cui | H04W 24/10 |
| 2021/0037530 A1* | 2/2021 | Shih | H04W 72/53 |
| 2021/0058807 A1* | 2/2021 | Cui | H04W 24/10 |
| 2021/0112434 A1* | 4/2021 | Josan | H04W 72/04 |
| 2021/0195488 A1* | 6/2021 | Zhang | H04W 36/08 |
| 2021/0235339 A1* | 7/2021 | Babaei | H04W 36/06 |
| 2021/0321279 A1* | 10/2021 | Yang | H04L 5/0057 |
| 2021/0337377 A1* | 10/2021 | Manolakos | H04W 72/0446 |
| 2022/0078650 A1* | 3/2022 | Lee | H04W 24/08 |
| 2022/0264622 A1* | 8/2022 | Lee | H04W 72/1268 |
| 2023/0106254 A1* | 4/2023 | Li | H04L 5/001 |
| | | | 370/252 |
| 2024/0163752 A1* | 5/2024 | Cui | H04W 36/0088 |

\* cited by examiner

Table 500

| MG sharing factor between L1 and L3 (P_L1) | Value of P_L1 (%) |
|---|---|
| 00 | Equal splitting |
| 01 | 25 |
| 10 | 50 |
| 11 | 75 |

```
-- ASN1START
-- TAG-MEASGAPSHARINGCONFIG-START

MeasGapSharingConfig ::=       SEQUENCE {
    gapSharingFR2              SetupRelease { MeasGapSharingScheme }    OPTIONAL,    -- Need M
    ...,
    [[
    gapSharingFR1              SetupRelease { MeasGapSharingScheme }    OPTIONAL,    --Need M
    gapSharingUE               SetupRelease { MeasGapSharingScheme }    OPTIONAL,    --Need M
    ]]
    gapSharingUEL1L3           SetupRelease { MeasGapSharingSchemeforL1 } OPTIONAL   --Need M
}

MeasGapSharingScheme::=        ENUMERATED {scheme00, scheme01, scheme10, scheme11}
MeasGapSharingSchemeforL1::=   ENUMERATED {scheme00, scheme01, scheme10, scheme11}
-- TAG-MEASGAPSHARINGCONFIG-STOP
-- ASN1STOP
```

Fig. 6

Table 700

| Measurement category | MG sharing factor |
|---|---|
| Intra-frequency measurement for L3 based mobility | A1 |
| Inter-frequency/inter-RAT measurement for L3 based mobility | A2 |
| Intra-frequency measurement for L1/L2 based mobility | A3 |
| Inter-frequency measurement for L1/L2 based mobility | A4 |

Fig. 7

```
-- ASN1START
-- TAG-MEASGAPSHARINGCONFIG-START

MeasGapSharingConfig ::=        SEQUENCE {
    gapSharingFR2               SetupRelease { MeasGapSharingScheme }   OPTIONAL,   -- Need M
    ...,
    [[
    gapSharingFR1               SetupRelease { MeasGapSharingScheme }   OPTIONAL,   --Need M
    gapSharingUE                SetupRelease { MeasGapSharingScheme }   OPTIONAL    --Need M
    ]]
    gapSharingUE1lL3-A1         ENUMERATED {0%, 25%, 50%, 75%} OPTIONAL             --Need M
    gapSharingUE1lL3-A2         ENUMERATED {0%, 25%, 50%, 75%} OPTIONAL             --Need M
    gapSharingUE1lL3-A3         ENUMERATED {0%, 25%, 50%, 75%} OPTIONAL             --Need M
    gapSharingUE1lL3-A4         ENUMERATED {0%, 25%, 50%, 75%} OPTIONAL             --Need M
}

MeasGapSharingScheme ::=   ENUMERATED {scheme00, scheme01, scheme10, scheme11}

-- TAG-MEASGAPSHARINGCONFIG-STOP
-- ASN1STOP
```

Fig. 8

MEASUREMENT GAP SHARING FOR L1/L2 BASED MOBILITY AND L3 BASED MOBILITY

BACKGROUND

A user equipment (UE) may connect to multiple different networks or types of networks. To maintain the connection, the UE may be configured to perform measurements for layer 3 (L3) based mobility during a measurement gap. The UE may also be configured to perform measurements for layer 1 (L1)/layer 2 (L2) based mobility. There exists a need for techniques configured to enable the UE to implement measurement gap sharing for L3 based mobility and L1/L2 based mobility.

SUMMARY

Some exemplary embodiments are related to a processor of a user equipment (UE) configured to perform operations. The operations include determining a measurement gap sharing scheme for layer 1 (L1)/layer 2 (L2) based mobility and layer 3 (L3) based mobility, determining a measurement gap pattern, wherein at least one measurement gap includes L1/L2 measurement occasions and L3 measurement occasions and collecting measurement data during the at least one measurement gap in accordance with the measurement gap sharing scheme.

Other exemplary embodiments are related to a user equipment (UE) having a transceiver configured to communicate with a network and a processor communicatively coupled to the transceiver and configured to perform operations. The operations include determining a measurement gap sharing scheme for layer 1 (L1)/layer 2 (L2) based mobility and layer 3 (L3) based mobility, determining a measurement gap pattern, wherein at least one measurement gap includes L1/L2 measurement occasions and L3 measurement occasions and collecting measurement data during the at least one measurement gap in accordance with the measurement gap sharing scheme.

BRIEF DESCRIPTION OF THE DRAWINGS

FIG. 6 shows an example of an abstract syntax notation one (ASN.1) that may be used to indicate a sharing factor that is to be used for measurement resource allocation according to various exemplary embodiments.

FIG. 7 shows a table for measurement resource allocation for measurement gap sharing scheme C according to various exemplary embodiments.

FIG. 8 shows an example of an ASN.1 that may be used to indicate the sharing factor that is to be used for measurement resource allocation according to various exemplary embodiments.

DETAILED DESCRIPTION

Figure 1:
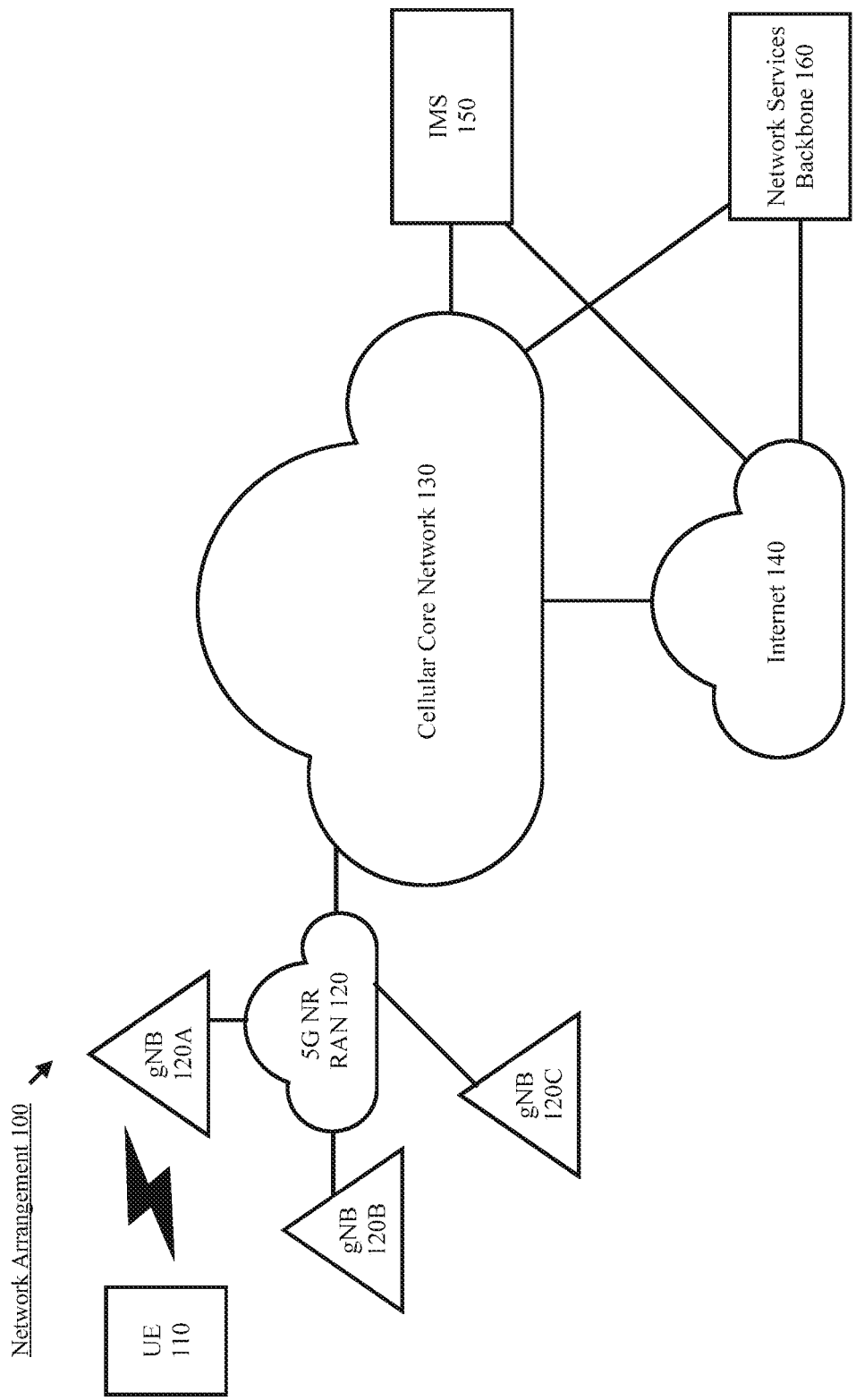
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce techniques that enable a user equipment (UE) to implement measurement gap sharing for layer 3 (L3) based mobility and layer 1 (L1)/layer 2 (L2) based mobility.

The exemplary embodiments are described with regard to a UE. However, reference to the term UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a measurement gap. Those skilled in the art will understand that the term "measurement gap" generally refers to a time duration during which the UE may collect measurement data corresponding to cells other than a currently configured serving cell. For example, while camped on a cell, the UE may be configured with a measurement gap during which the UE may tune away from the serving cell and scan various frequencies for signals broadcast by other cells, either from the same network or a different network. The UE may collect measurement data based on signals received during the measurement gap. The measurement data collected by the UE may then be used by the UE and/or the network for a variety of different purposes including, but not limited to, mobility management, cell beam management, selection, cell reselection, handover, carrier aggregation (CA), dual connectivity, radio resource management, etc. However, the subsequent use of the measurement data is beyond the scope of the exemplary embodiments. The exemplary embodiments are directed towards measurement group sharing regardless of how the measurement data is utilized by the UE and/or network.

During operation, the UE may be configured with a measurement gap pattern. To provide an example, consider a scenario in which a measurement gap pattern is configured with a measurement gap length of (Y) seconds and a repetition period of (X) seconds. Initially, a first measurement gap is triggered. The UE may tune its transceiver to one or more frequencies scanning for signals broadcast by surrounding cells for (Y) seconds. After the expiration of the measurement gap, the UE may tune back to its serving cell. A second measurement gap may be triggered (X) seconds after the first measurement gap. The UE may once again tune its transceiver to one or more frequencies scanning for signals broadcast by surrounding cells for (Y) seconds. The above example is merely provided as a general example of a measurement gap pattern and is not intended to limit the exemplary embodiments in any way.

Under conventional circumstances, the UE may perform measurements for L3 based mobility during a measurement gap. Those skilled in the art will understand that L3 based mobility refers to a legacy approach where the network changes the serving cell for the UE via radio resource control (RRC) signaling. For example, the network may trigger a handover of the UE from a first cell to a second cell using one or more RRC messages.

The exemplary embodiments introduce techniques configured to enable the UE to implement measurement gap sharing for L3 based mobility and L1/L2 based mobility. Those skilled in the art will understand that L1/L2 based mobility generally refers to a mechanism that allows the network to change a serving cell of the UE by changing the transmission configuration indicator (TCI) state. For L1 based mobility, the TCI state may be changed by the network via L1 downlink control information (DCI). For L2 based mobility, the TCI state may be changed by the network via L2 medium access control (MAC) control element (CE) commands. Thus, L1/L2 based mobility refers to two different procedures that rely on a similar concept but are distinguished from one another based on the manner in which the network triggers the UE transition from a serving cell to a target cell, e.g., DCI or MAC CE. Throughout this description, the term "L1/L2 based mobility" refers to either a L1 based mobility procedure or a L2 based mobility procedure.

The UE may perform measurements for L1/L2 based mobility on one or more neighbor cells. The measurements may include measurements for intra-frequency L1/L2 based mobility and measurements for inter-frequency L1/L2 based mobility. Since different TCI states may be associated with a specific downlink reference signal, e.g., a signal synchronization block (SSB) or a channel state information (CSI)-reference signal (RS), the measurements for L1/L2 based mobility may be based on SSB, CSI-RS or any other appropriate downlink resource. The measurement metric for L1/L2 based mobility may be L1-reference signal received power (RSRP), L1-signal interference-to-noise ratio (SINR), L1-reference signal received quality (RSRQ) or any other appropriate type of metric. However, any reference to L1/L2 based mobility utilizing a specific type of measurement, reference signal or metric is merely provided for illustrative purposes. The exemplary embodiments may apply to L1/L2 based mobility that utilizes any appropriate type of measurement, reference signal or metric.

The UE may be configured to perform measurements for L1/L2 based mobility and measurement for L3 based mobility. The exemplary embodiments introduce techniques that enable the UE to implement measurement gap sharing for L1/L2 based mobility and L3 based mobility. In one aspect, the exemplary embodiments relate to how the measurement gap is to be utilized by the UE when measurement occasions for L1/L2 based mobility and measurement occasions for L3 based mobility are both configured within the measurement gap. In another aspect, the exemplary embodiments introduce signaling techniques for enabling measurement gap sharing between L1/L2 based mobility and L3 based mobility. Each of these exemplary aspects will be described in more detail below. The exemplary embodiments may be utilized in conjunction with currently implemented measurement gap schemes, future implementations of measurement gap schemes or independently from other measurement gap schemes.

FIG. 1 shows an exemplary network arrangement 100 according to various exemplary embodiments. The exemplary network arrangement 100 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a fifth generation (5G) new radio (NR) radio access network (RAN) 120. However, the UE 110 may also communicate with other types of networks 110 (e.g., 5G cloud RAN, a next generation RAN (NG-RAN), long term evolution (LTE) network, a legacy cellular network, a wireless local area network (WLAN), etc.) and the UE 110 may also communicate with networks over a wired connection. Therefore, in this example, the UE 110 may have a 5G NR chipset to communicate with the 5G NR RAN 120.

The 5G NR-RAN 120 may be a portion of cellular networks that may be deployed by cellular providers (e.g., Verizon, AT&T, T-Mobile, etc.). The network 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 is shown with a gNB 120A, a gNB 120B and a gNB 120C. However, an actual network arrangement may include any number of different types of base stations or cells deployed by any number of RANs. Thus, the example of a single 5G NR RAN 120 and three gNBs 120A, 120B, 120C is merely provided for illustrative purposes.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell or base station (e.g., gNB 120A, gNB 120B or gNB 120C).

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
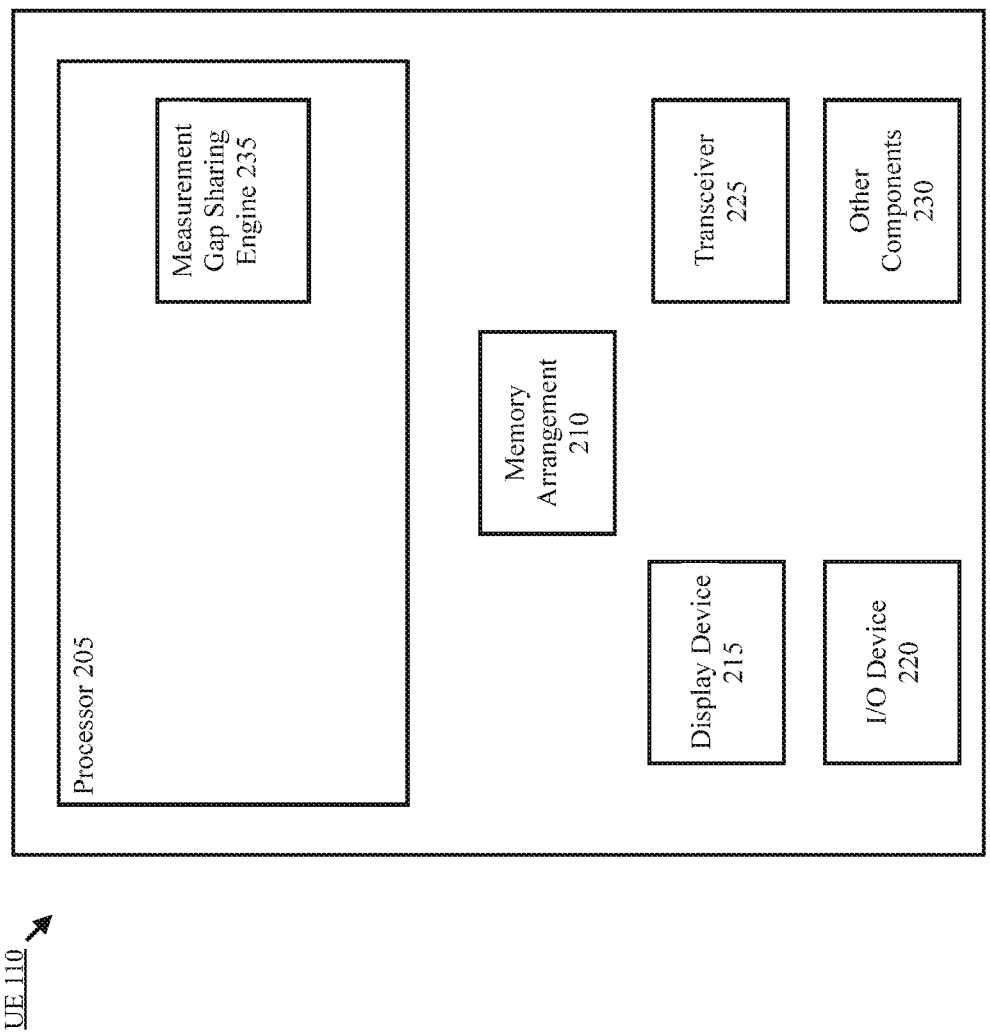
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a measurement gap sharing engine 235. The measurement gap sharing engine 235 may perform various operations related to configuring a measurement gap, implementing a measurement gap sharing scheme, performing measurements for L1/L2 based mobility and performing measurements for L3 based mobility.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and/or any other appropriate type of network. Accordingly, the transceiver 225 may operate on a variety of different frequencies or channels (e.g., set of consecutive frequencies).

Figure 3:
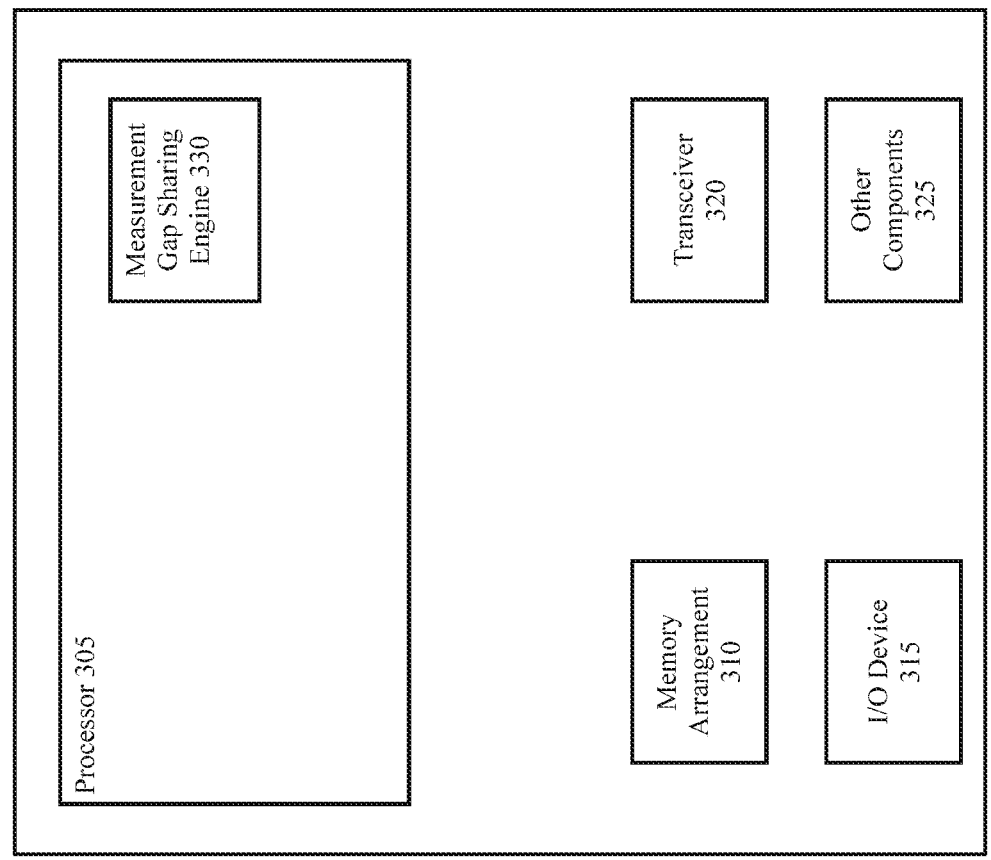
FIG. 3 shows an exemplary base station according to various exemplary embodiments.

FIG. 3 shows an exemplary base station 300 according to various exemplary embodiments. The base station 300 may represent any access node (e.g., gNB 120A, gNB 120B, gNB 120C, etc.) through which the UE 110 may establish a connection and manage network operations.

The base station 300 may include a processor 305, a memory arrangement 310, an input/output (I/O) device 315, a transceiver 320, and other components 325. The other components 325 may include, for example, a battery, a data acquisition device, ports to electrically connect the base station 300 to other electronic devices, etc.

The processor 305 may be configured to execute a plurality of engines of the base station 300. For example, the engines may include a measurement gap sharing engine 330. The measurement gap sharing engine 330 may perform various operations related to configuring the UE 110 with a measurement gap that is to be used for both L1/L2 based mobility and L3 based mobility. These operations may include but are not limited to, receiving UE capability information and transmitting measurement gap sharing configuration information.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

Figure 4:
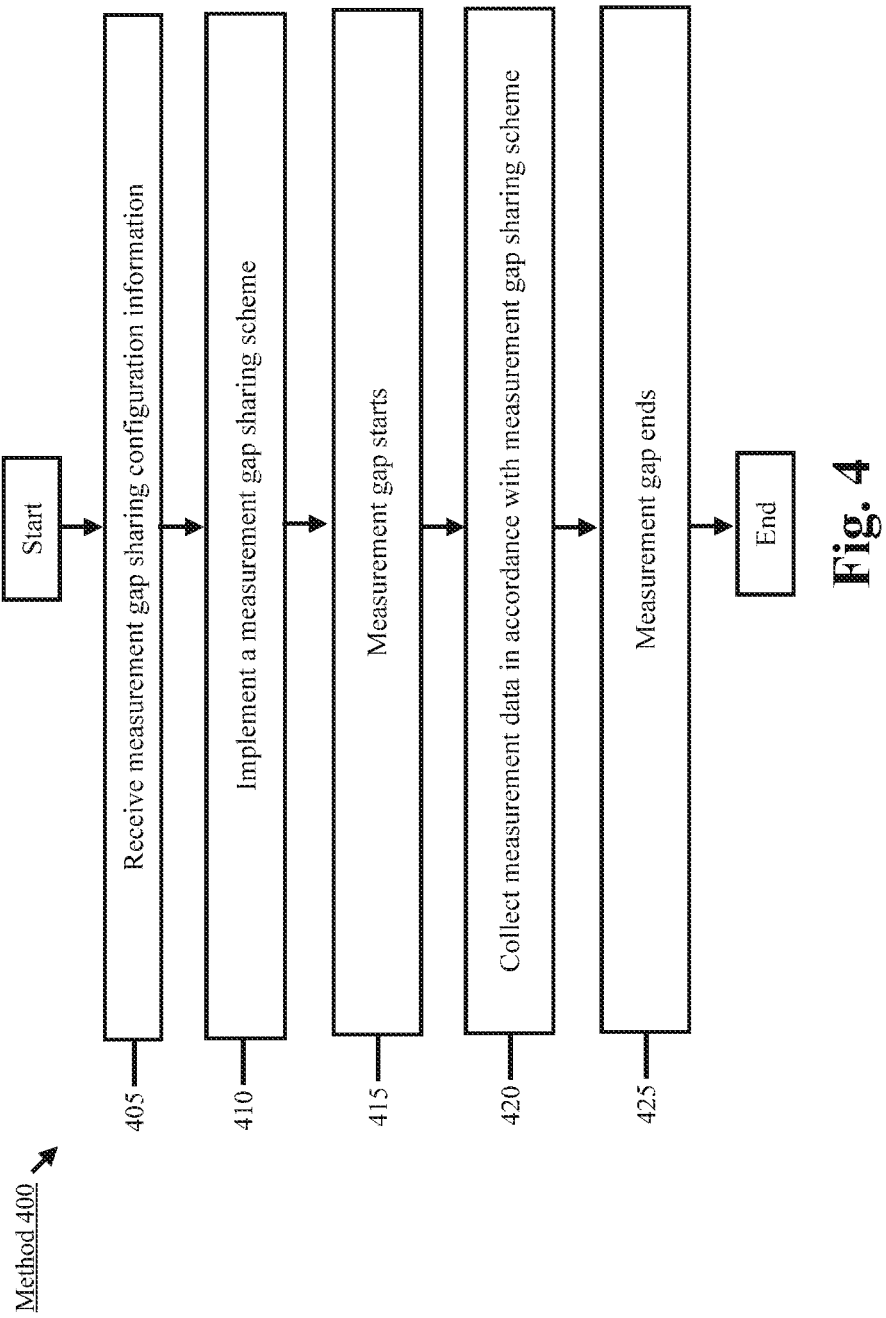
FIG. 4 shows a method for measurement gap sharing according to various exemplary embodiments.

FIG. 4 shows a method 400 for measurement gap sharing according to various exemplary embodiments. The method 400 will be described from the perspective of the UE 110 and is provided as a general overview of measurement gap sharing for L1/L2 based mobility and L3 based mobility.

The exemplary embodiments are described with regard to a measurement gap sharing scheme. Throughout this description, the term "measurement gap sharing scheme" may generally refer to how the UE 110 is configured to manage collecting measurement data for both L1/L2 based mobility and L3 based mobility during a measurement gap. To provide an example, the measurement gap sharing scheme may include the type of measurements that are be performed during the measurement gap, e.g., measurements for inter-frequency L1/L2 based mobility, measurements for intra-frequency L1/L2 based mobility, measurements for inter-frequency L3 based mobility and measurements for intra-frequency L3 based mobility. To provide another example, the measurement gap sharing scheme may include values indicating how much of the measurement gap is to be utilized for each type of measurement.

Initially, consider a scenario in which the UE 110 is camped on the gNB 120A. In 405, the UE 110 receives measurement gap sharing configuration information. The measurement gap sharing configuration information may comprise a variety of information such as, but not limited to, an indication of the type of measurements to be performed during the measurement gap and an indication as to how much of the measurement gap is to be utilized for each type of measurement. Thus, the measurement gap sharing configuration information may provide an explicit or implicit indication as to how the measurement gap is to be shared.

In some embodiments, the measurement gap sharing configuration information may be provided to the UE 110 by the network. For instance, in this example, the gNB 120A may transmit measurement gap sharing configuration information to the UE 110 in one or more RRC messages. In other embodiments, measurement gap sharing configuration information may be specified in 3GPP specifications, hard-coded or pre-provisioned by the manufacturer. However, the above examples are merely provided for illustrative purposes, the exemplary embodiments may apply to the measurement gap sharing configuration information being provided to the UE 110 in any appropriate manner.

In 410, the UE 110 implements a measurement gap sharing scheme. The exemplary embodiments describe four different measurement gap sharing schemes. Throughout this description, to differentiate between different measurement gap sharing schemes, the exemplary embodiments refer to "scheme A," "scheme B," "scheme C," and "scheme D." However, any reference to a particular scheme including a particular technique is merely provided for illustrative purposes. Any of the exemplary measurement gap sharing techniques described herein may be used in conjunction with any currently implemented measurement gap sharing technique, future implementations of measurement gap sharing techniques or independently from other measurement gap sharing techniques. Examples of each of these schemes will be described in detail below. Additional details regarding these schemes are also provided in the signaling diagram 900 of FIG. 9.

In measurement gap sharing scheme A, measurements for L1/L2 based mobility may be considered for measurement gap sharing when i) measurements for inter-frequency L1/L2 based mobility or measurements for intra-frequency L1/L2 based mobility may be performed during a measurement gap and ii) the UE 110 is also configured with other measurement occasions for L3 based mobility within the measurement gap (e.g., L3 measurement occasions).

Those skilled in the art will understand that a measurement occasion represents a time duration during which a cell may transmit a reference signal that may be used by the UE 110 to perform measurements. Throughout this description, a "L1/L2 measurement occasion" may refer to a time duration during which a neighbor cell may transmit SSB, CSI-RS or any other appropriate type of downlink reference that may be used by the UE to perform measurements for L1/L2 based mobility. Similarly, a L3 measurement occasion may refer to a time duration during which a neighbor cell may transmit SSB, CSI-RS or any other appropriate type of downlink reference that may be used by the UE to perform measurements for L3 based mobility.

Measurement gap sharing scheme A may include measurement sharing within a measurement gap between two different categories, e.g., an intra-frequency measurement category and an inter-frequency measurement category. During operation, a first portion of the measurement gap may be used to perform intra-frequency measurements and a second portion of the measurement gap may be used for inter-frequency measurements. The first portion and the second portion may equal the total duration of a single measurement gap.

The intra-frequency measurement category for measurement gap sharing scheme A may include measurements for intra-frequency L1/L2 based mobility within the measurement gap and measurements for intra-frequency L3 based mobility within the measurement gap. For this category, all the target carriers for measurement may equally share the available measurement gaps. For example, if there are (X) available measurement gaps in a measurement gap pattern and a total of (Y) L1/L2 and/or L3 intra-frequency carriers are to be measured, each carrier would correspond to an equal number of measurement gaps, e.g., X/Y measurement gaps.

Similarly, the inter-frequency measurement category for measurement gap sharing scheme A may include measurements for inter-frequency L1/L2 based mobility within the measurement gap and measurement for inter-frequency L3 based mobility within the measurement gap. For this category, all the target carriers for measurement may equally share the available measurement gaps. For example, if there are (M) available measurement gaps in a measurement gap pattern and a total of (N) L1/L2 and/or L3 inter-frequency carriers are to be measured, each carrier would correspond to an equal number of measurement gaps, e.g., M/N measurement gaps.

Therefore, in accordance with measurement gap sharing scheme A, measurement gap sharing may occur within a single measurement gap between the intra-frequency measurement category and the inter-frequency measurement category. Inside each category, different carriers and/or types of measurements (e.g., L1/L2 or L3) may be performed across multiple measurement gaps of a measurement gap pattern.

In measurement gap sharing scheme B, measurements for L1/L2 based mobility may be considered for measurement gap sharing when i) measurements for inter-frequency L1/L2 based mobility or measurements for intra-frequency mobility may be performed during a measurement gap and ii) the UE 110 is also configured with other measurement occasions for L3 based mobility within the measurement gap (e.g., L3 measurement occasions). Like measurement gap sharing scheme A, measurement gap sharing scheme B may include measurement sharing within a measurement gap between two different categories, e.g., an intra-frequency measurement category and an inter-frequency measurement category. During operation, a first portion of the measurement gap may be used to perform intra-frequency measurements and a second portion of the measurement gap may be used for inter-frequency measurements. The first portion and the second portion may equal the total duration of a single measurement gap. However, unlike measurement gap sharing scheme A, within each category the measurements for LT/L2 based mobility and the measurement for L3 based mobility may be treated differently.

The intra-frequency measurement category for measurement gap sharing scheme B may include measurements for intra-frequency L1/L2 based mobility within the measurement gap and measurements for intra-frequency L3 based mobility within the measurement gap. For this category, measurements for L1/L2 based mobility may have a different priority than measurements for L3 based mobility. Therefore, the measurement resource allocation between measurements for intra-frequency L1/L2 based mobility within the measurement gap and the measurements for intra-frequency L3 based mobility may be based on a sharing factor.

In some embodiments, the sharing factor may be fixed and pre-provisioned to the UE 110. In other embodiments, an indication of the sharing factor may be signaled to the UE 110 as part of measurement gap sharing configuration information. To provide an example, the network may indicate to the UE 110 the percentage of the measurement resources corresponding to this category within the measurement gap that are to be used to perform measurements for intra-frequency L1/L2 based mobility and the percentage of the measurement resources within the measurement gap that are to be used to perform measurements for intra-frequency L3 based mobility. To provide an example, the network signaling may indicate that (K) percentage of the measurement resources corresponding to this category are for intra-frequency L1/L2 based mobility and (L) percentage of the measurement resources corresponding to this category are for intra-frequency L3 based mobility.

The inter-frequency measurement category for measurement gap sharing scheme B may include measurements for L1/L2 inter-frequency mobility within the measurement gap and measurements for L3 inter-frequency mobility within the measurement gap. For this category, measurements for L1/L2 based mobility may have a different priority than measurements for L3 based mobility. Therefore, the measurement resource allocation between measurements for L1/L2 inter-frequency mobility within the measurement gap and the measurements for L3 inter-frequency mobility may be based on a sharing factor.

In some embodiments, the sharing factor may be fixed and pre-provisioned to the UE 110. In other embodiments, the sharing factor may be signaled to the UE 110 as part of measurement gap sharing configuration information. To provide an example, the network may indicate to the UE 110 the percentage of the measurement resources corresponding to this category within the measurement gap that are to be used to perform measurements for inter-frequency L1/L2 based mobility and the percentage of the measurement resources within the measurement gap that are to be used to perform measurements for inter-frequency L3 based mobility and/or inter-RAT mobility. To provide an example, the network signaling may indicate that (K) percentage of the measurement resources corresponding to this category are for inter-frequency L1/L2 based mobility and (L) percentage of the measurement resources corresponding to this category are for inter-frequency L3 based mobility.

Figure 5:
FIG. 5 shows a table for measurement resource allocation for measurement gap sharing scheme B according to various exemplary embodiments.

FIG. 5 shows a table 500 for measurement resource allocation for measurement gap sharing scheme B according to various exemplary embodiments. In conjunction with network signaling, this type of associations shown in this table may be used to indicate to the UE 110 the sharing factor that is to be used for measurement resource allocation. FIG. 6 shows an example of an abstract syntax notation one (ASN.1) that may be used to indicate a sharing factor that is to be used for measurement resource allocation.

To provide an example within the context of FIGS. 5-6, when the network signals "00," "01," "10" or "11" with RRC MeasGapSahringSchemeforL1 and the value of the measurement gap sharing factor (P_L1) is defined as in the right column of the table 500, the UE 110 may determine the measurement resource allocation within the measurement gap. In this example, the measurement period extension factor for intra-frequency L1/L2 based mobility may be equal to $K_{intra}*100(P\_L1)$ where $K_{intra}$ is defined in third generation partnership (3GPP) technical specification (TS) 38.133. The measurement period extension factor for intra-frequency L3 based mobility may be equal to $K_{intra}*100/(100-P\_L1)$. Thus, for the intra-frequency measurement category, a single indication may be used to determine the measurement resource allocation percentage for both intra-frequency L1/L2 based mobility and intra-frequency L3 based mobility.

In addition, the measurement period extension factor for inter-frequency L1/L2 based mobility may be equal to $K_{inter}*100/(P\_L1)$ where $K_{inter}$ is defined in 3GPP TS 38.133. The measurement period extension factor for inter-frequency L3 based mobility may be equal to $K_{inter}*100/(100-P\_L1)$. Thus, for the inter-frequency measurement category, a single indication may be used to determine the measurement resource allocation percentage for both inter-frequency L1/L2 based mobility and inter-frequency L3 based mobility. This indication may be the same indication that is used for the intra-frequency measurement category. Accordingly, in some embodiments, a single RRC parameter value may be used by the UE 110 to determine the measurement resource allocation percentages within the measurement gap for intra-frequency L1/L2 based mobility, intra-frequency mobility L3 based, inter-frequency L1/L2 based mobility and inter-frequency L3 based mobility.

In measurement gap sharing scheme C, measurements for L1/L2 based mobility may be considered for measurement gap sharing when i) measurements for inter-frequency L1/L2 based mobility or measurements for intra-frequency L1/L2 based mobility may be performed during a measurement gap and ii) the UE 110 is also configured with other measurement occasions for L3 based mobility within the measurement gap (e.g., L3 measurement occasions). However, unlike measurement gap sharing schemes A and B, within each category the measurements for L1/L2 based mobility and the measurement for L3 based mobility may be treated differently. Measurement gap sharing scheme C may include four different categories, e.g., L1/L2 intra-frequency measurement category, L3 intra-frequency measurement category, an L1/L2 inter-frequency measurement category and a L3 inter-frequency measurement category. During operation, a portion of the measurement gap may correspond to each category.

The L3 intra-frequency measurement category may include measurements for intra-frequency L3 based mobility within the measurement gap. As will be described in more detail below with regard to FIGS. 7-8, the measurement resource sharing factor for this category may be referred to as "A1." The L3 inter-frequency measurement category may include measurements for inter-frequency L3 based mobility within the measurement gap. As will be described in more detail below with regard to FIGS. 7-8, the measurement resource sharing factor for this category may be referred to as "A2." The L1/L2 intra-frequency measurement category may include measurements for intra-frequency L1/L2 based mobility within the measurement gap. As will be described in more detail below with regard to FIGS. 7-8, the measurement resource sharing factor for this category may be referred to as "A3." The L1/L2 inter-frequency measurement category may include measurements for inter-frequency L3 based mobility within the measurement gap. As will be described in more detail below with regard to FIGS. 7-8, the measurement resource sharing factor for this category may be referred to as "A4."

In one example, using RRC, MAC or a physical layer indication, the network may indicate A1, A2, A3 and A4 such that the total of A1+A2+A3+A4 is equal to 100% of the measurement gap. In some embodiments, only three of the measurement resource sharing factors may be indicated to the UE 110 and the UE 110 may then derive the measurement resource sharing factor. For example, if the UE 110 is provided with A1, A2 and A3, then A4 may be equal to 100%−A1−A2−A3.

FIG. 7 shows a table 700 for measurement resource allocation for measurement gap sharing scheme C according to various exemplary embodiments. In conjunction with network signaling, the type of associations shown in this table may be used to indicate to the UE 110 the sharing factor that is to be used for measurement resource allocation. FIG. 8 shows an example of an abstract syntax notation one (ASN.1) that may be used to indicate the sharing factor that is to be used for measurement resource allocation.

To provide an example within the context of FIGS. 7-8, when the network signals a measurement gap sharing factor (A1/A2/A3/A4) with RRC parameter MeasGapSharingSchemeforL1 as shown in the column on the right side of the table 700 and the total of A1+A2+A3+A4 is equal to 100%, the measurement extension factor for intra-frequency L1/L2 based mobility may be equal to 1/(A3). The measurement extension factor for intra-frequency L3 based mobility may be equal to 1/(A1). The measurement extension factor for inter-frequency L1/L2 based mobility may be equal to 1/(A4). The measurement extension factor for inter-frequency L3 based mobility may be equal to 1/(A2).

Measurement gap sharing scheme D relates to a scenario in which L1/L2 measurement occasions and L3 measurement occasions overlap within the measurement gap. In a first option, e.g., measurement gap sharing scheme D-1, the UE 110 may prioritize measurements for L1/L2 based mobility. Thus, if a L1/L2 measurement occasion and a L3 measurement occasion overlap in the time domain, the UE 110 may perform the measurement for L1/L2 based mobility and omit the measurement for L3 based mobility.

In a second option, e.g., measurement gap sharing scheme D-2, the UE 110 may prioritize measurements for L1/L2 based mobility and utilize a fixed sharing factor between measurements for L1/L2 based mobility and measurement for L3 based mobility. For example, there may be a scenario in which L3 measurement occasions are configured with a smaller periodicity than L1/L2 measurement occasions (e.g., partially overlapped). Thus, the measurement gap pattern may include measurement gaps that contain both L1/L2 measurement occasions and L3 measurement occasions and measurement gaps that only include L3 measurement occasions or L1/L2 measurement occasions. In this example, the UE 110 may perform measurements for L1/L2 based mobility during a measurement gap that includes both L3 measurement occasions and L1/L2 measurement occasions and perform measurements for L3 based mobility during a measurement gap that does not include L1/L2 measurement occasions.

In another example, there may be a scenario in a measurement gap pattern of (R) measurement gaps include L3 measurement occasions and L1/L2 measurement occasions in each measurement gap of the measurement gap pattern (e.g., fully overlapped). In this example, the UE 110 may use (S) measurement gaps out of the (R) measurement gaps to perform measurements for L3 based mobility (e.g., R/S) and use (R-S) measurement gaps to perform measurements for L1/L2 based mobility.

In a third option, e.g., measurement gap sharing scheme D-3, the UE 110 may prioritize measurements for L3 based mobility. Thus, if a L3 measurement occasion and a L1/L2 measurement occasion overlap in the time domain, the UE 110 may perform the measurement for L3 based mobility and omit the measurement for L3 based mobility.

In a fourth option, e.g., measurement gap sharing scheme D-4, the UE 110 may prioritize measurements for L3 based mobility and utilize a fixed sharing factor between measurements for L3 based mobility and measurements for L1/L2 based mobility. For example, there may be a scenario in which L1/L2 measurement occasions are configured with a smaller periodicity than L3 measurement occasions (e.g., partially overlapped). Thus, the measurement gap pattern may include measurement gaps that contain both L3 measurement occasions and L1/L2 measurement occasions and measurement gaps that only include L3 measurement occasions or L1/L2 measurement occasions. In this example, the UE 110 may perform measurements for L3 based mobility during a measurement gap that includes both L3 measurement occasions and L1/L2 measurement occasions and perform measurements for L1/L2 based mobility during a measurement gap that does not include both L3 measurement occasions.

In another example, there may be a scenario in a measurement gap pattern of (Y) measurement gaps include L1/L2 measurement occasions and L3 measurement occasions in each measurement gap of the measurement gap pattern (e.g., fully overlapped). In this example, the UE 110 may use (R) measurement gaps out of the (S) measurement gaps to perform measurements for L1/L2 based mobility (e.g., R/S) and use (S-R) measurement gaps to perform measurements for L3 based mobility.

As indicated above, in 410, the UE 110 may implement a measurement gap sharing scheme. Thus, in this example, the UE 110 may implement one of measurement gap sharing scheme A, measurement gap sharing scheme B, measurement gap sharing scheme C and/or measurement gap sharing scheme D.

In 415, a measurement gap starts and the UE 110 tunes away from the serving cell. In 420, the UE 110 collects measurement data for L1/L2 based mobility and/or L3 based mobility during the measurement gap in accordance with the measurement gap sharing scheme implemented in 410. In 425, the measurement gap ends and the UE 110 tunes back to the serving cell. Subsequently, the method 400 ends.

The measurement data collected by the UE 110 during one or more measurement gaps may then be used by the UE 110 and/or the network for a variety of different purposes including, but not limited to, mobility management, cell beam management, selection, cell reselection, handover, carrier aggregation (CA), dual connectivity, radio resource management, etc. Thus, after the method 400, the UE 110 may be triggered to send a measurement report to the network and/or initiate a mobility procedure. However, the subsequent use of the measurement data is beyond the scope of the exemplary embodiments. The exemplary embodiments are directed towards measurement group sharing regardless of how the measurement data is utilized by the UE 110 and/or network.

Figure 9:
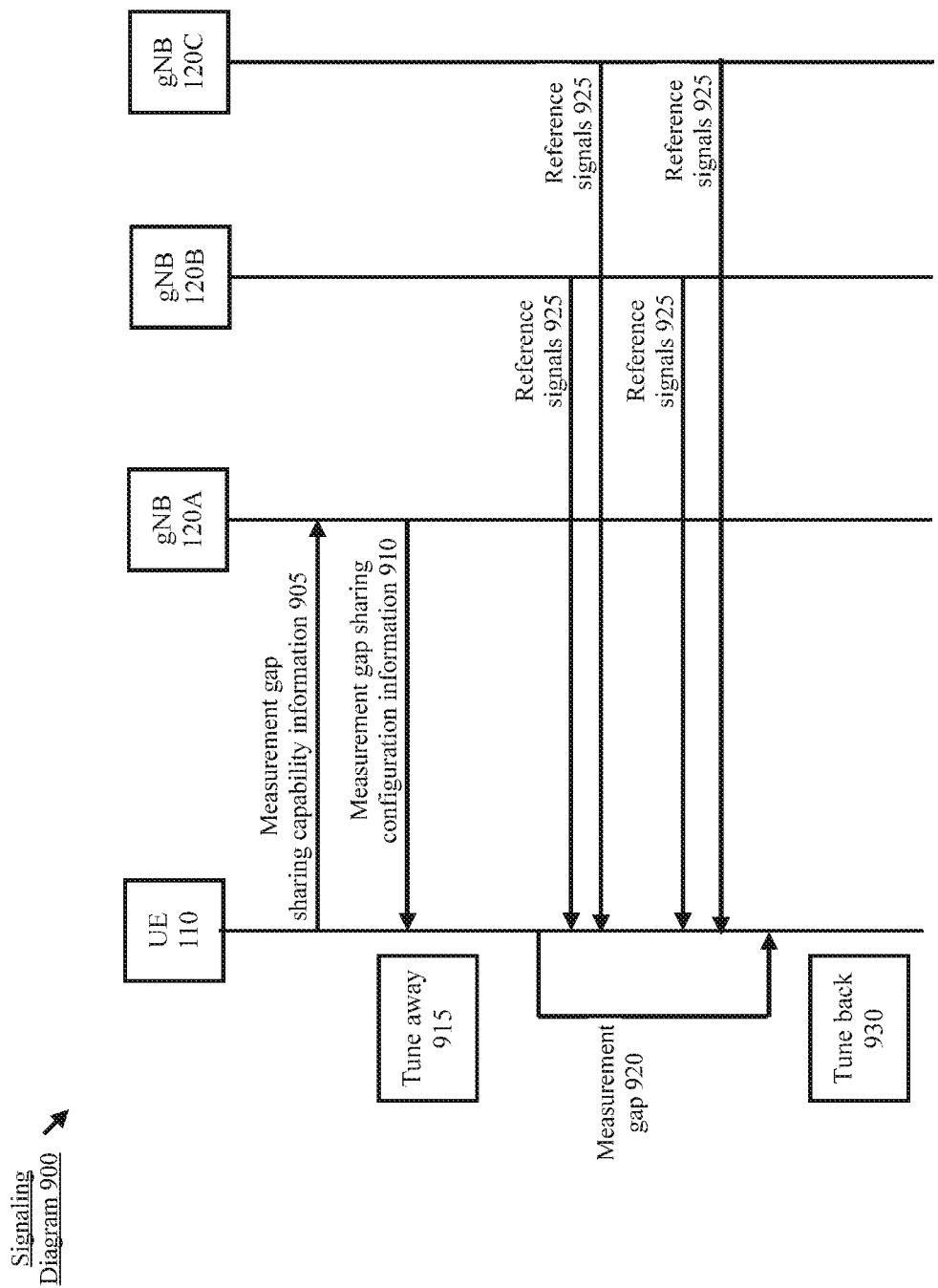
FIG. 9 shows a signaling diagram for the UE to implement a measurement gap sharing scheme for layer 1 (L1)/ layer 2 (L2) based mobility and layer 3 (L3) based mobility according to various exemplary embodiments.

FIG. 9 shows a signaling diagram 900 for the UE 110 to implement a measurement gap sharing scheme for L1/L2 based mobility and L3 based mobility according to various exemplary embodiments. The signaling diagram 900 include the UE 110, the gNB 120A, the gNB 120B and the gNB 120C. In this example, the gNB 120A is the serving cell for the UE 110 and the gNBs 120B, 1200 include neighbor cells.

In 905, the UE 110 transmits measurement gap sharing capability information to the gNB 120A. In some embodiments, the capability information may indicate whether the UE 110 supports measurement gap based L1-RSRP and/or measurements for L1/L2 based mobility. In other embodiments, the capability information may indicate whether the UE 110 supports measurements for L1/L2 based mobility when a target reference signal is outside of UE 110 active bandwidth part (BWP). In other embodiments, the capability information may indicate whether the UE 110 supports measurement for inter-frequency L1/L2 based mobility. All of the examples provided above would indicate to the network that the UE 110 supports measurement gap sharing for L1/L2 based mobility and L3 based mobility.

In some embodiments, the capability information may indicate whether the UE 110 supports measurement gap sharing for L1/L2 based mobility and L3 based mobility. If the capability information indicates that the UE 110 supports this capability, measurement gap sharing scheme A, measurement gap sharing scheme B or measurement gap sharing scheme C may be implemented. If the capability information indicates that the UE 110 does not support this capability, measurement gap sharing scheme D-1 or measurement gap sharing scheme D-2 may be implemented. Alternatively, if the capability information indicates that the UE 110 does not support this capability, measurement gap sharing scheme D-3 or measurement gap sharing scheme D-4 may be implemented.

In 910, the gNB 120A transmits measurement gap sharing configuration information to the UE 110. This information may indicate how a measurement gap is to be shared for L1/L2 based mobility and L3 based mobility. Within the context of the method 400, if measurement gap sharing scheme B is to be utilized, the measurement gap sharing configuration information may indicate a sharing factor for the intra-frequency measurement category and the inter-frequency measurement category. For instance, the gNB 120A may transmit a RRC message as illustrated by the ASN.1 of FIG. 6. If measurement gap sharing scheme C is to be utilized, the measurement gap sharing configuration information may indicate a sharing factor for the L1/L2 intra-frequency measurement category, L3 intra-frequency measurement category, an L1/L2 inter-frequency measurement category and a L3 inter-frequency measurement category. For instance, the gNB 120A may transmit a RRC message as illustrated by the ASN.1 of FIG. 8.

Those skilled in the art will understand that other configuration information may be provided to the UE 110 for L1/L2 based mobility and L3 based mobility. This information may include, but is not limited to, the type of measurements to be performed, threshold values, measurement report types, neighbor cell frequencies, TCI states, measurement gap pattern configuration information, timing for L3 measurement occasions, timing for L1/L2 measurement occasions, etc.

In 915, the UE 110 tunes away from the gNB 120A (e.g., the serving cell). This operation marks the start of a measurement gap 920. As indicated above with regard to the method 400, the UE 110 may implement a measurement gap sharing scheme that defines how the UE 110 may perform measurements during the measurement gap. The actual measurement data collected during the measurement gap 920 may depend on the number of neighbor cells, the number of target carriers, the presence of L1/L2 measurement occasions, the presence of L3 measurement occasions, etc.

The signaling diagram 900 shows the gNB 120B and the gNB 120C transmitting multiple instances reference signals 925 (e.g., SSB, CSI-RS, etc.). These reference signal 925 may be used for the L1/L2 measurements or L3 measurements. However, this example is not intended to limit the exemplary embodiments in any way and is merely provided to illustrate that neighbor cells may transmit reference signals during the measurements gap 920. As described above, the operations performed may vary depend on factors such as, but not limited to, the measurement gap sharing scheme and whether or not there is a collision of L1/L2 measurement occasions and L3 measurement occasions.

In 930, the UE 110 tunes back to the gNB 120A. This marks the end of the measurement gap 920. As indicated above, the measurement data collected may be used by the UE 110 and/or the network for any of a wide variety of different purposes.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iCS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   determining a measurement gap sharing scheme for layer 1 (L1)/layer 2 (L2) based mobility and layer 3 (L3) based mobility, wherein the measurement gap scheme includes measurement gap sharing between an intra-frequency measurement category and an inter-frequency measurement category, wherein the inter-frequency measurement category includes sharing a measurement gap between at least L1-reference signal received power (RSRP) and layer 3 (L3) measurements;
   determining a measurement gap pattern, wherein at least one measurement gap includes L1/L2 measurement occasions and L3 measurement occasions; and
   collecting measurement data during the at least one measurement gap in accordance with the measurement gap sharing scheme.

2. The processor of claim 1, wherein the intra-frequency measurement category includes intra-frequency measurements for L1/L2 based mobility and intra-frequency measurements for L3 based mobility and wherein target carriers for measurement equally share measurement occasions across the measurement gap pattern.

3. The processor of claim 1, wherein the inter-frequency measurement category includes inter-frequency measurements for L1/L2 based mobility and inter-frequency and inter-RAT measurements for L3 based mobility and wherein target carriers for measurement equally share measurement occasions across the measurement gap pattern.

4. The processor of claim 1, the operations further comprising:
   receiving measurement gap sharing configuration information that indicates a percentage of measurement resources within the at least one measurement gap to be utilized for intra-frequency measurements for L1/L2 based mobility and intra-frequency measurements for L3 based mobility.

5. The processor of claim 1, the operations further comprising:
   receiving measurement gap sharing configuration information that indicates a percentage of measurement resources within the at least one measurement gap to be utilized for i) inter-frequency measurements for L1/L2 based mobility and ii) inter-frequency and inter-RAT measurements for L3 based mobility.

6. The processor of claim 1, wherein the measurement gap sharing scheme includes measurement gap sharing between an intra-frequency measurement category for L3 based mobility, an inter-frequency and inter-RAT measurement category for L3 based mobility, an intra-frequency measurement category for L1/L2 based mobility and a L1/L2 inter-frequency measurement category for L1/L2 based mobility.

7. The processor of claim 6, the operations further comprising:
receiving measurement gap sharing configuration information that includes a measurement sharing factor for the intra-frequency measurement category for L3 based mobility, a measurement sharing factor for the inter-frequency and inter-RAT measurement category for L3 based mobility, a measurement sharing factor for the intra-frequency measurement category for L1/L2 based mobility and a measurement sharing factor for the inter-frequency measurement category for L1/L2 based mobility.

8. The processor of claim 1, the operations further comprising:
determining that at least one measurement gap includes an overlap of L1/L2 measurement occasions and L3 measurement occasion, wherein the measurement gap sharing scheme prioritizes measurements for L1/L2 based mobility.

9. The processor of claim 8, wherein collecting the measurement data includes omitting measurements for L3 based mobility.

10. The processor of claim 8, wherein there is a partial overlap between the L1/L2 measurement occasions and the L3 measurement occasions and wherein collecting the measurement data includes performing measurements for L1/L2 based mobility when the at least one measurement gap includes both the L1/L2 measurement occasions and the L3 measurement occasion.

11. The processor of claim 8, wherein the L1/L2 measurement occasions and the L3 measurement occasions fully overlap and wherein a fixed sharing factor determines a number of measurement gaps to use for measurements for L1/L2 based mobility.

12. The processor of claim 1, the operations further comprising:
determining that at least one measurement gap includes an overlap of L1/L2 measurement occasions and L3 measurement occasion, wherein the measurement gap sharing scheme prioritizes measurements for L3 based mobility.

13. The processor of claim 12, wherein collecting the measurement data includes omitting measurements for L1/L2 based mobility.

14. The processor of claim 12, wherein there is a partial overlap between the L1/L2 measurement occasions and the L3 measurement occasions and wherein collecting the measurement data includes performing measurements for L3 based mobility when the at least one measurement gap includes both the L1/L2 measurement occasions and the L3 measurement occasion.

15. The processor of claim 12, wherein the L1/L2 measurement occasions and the L3 measurement occasions fully overlap and wherein a fixed sharing factor determines a number of measurement gaps to use for measurements for L3 based mobility.

16. The processor of claim 1, the operations further comprising:
transmitting measurement gap sharing capability information to a network.

17. The processor of claim 16, wherein the capability information indicates one of i) whether the UE supports measurements for L1/L2 based mobility with measurement gap, ii) whether the UE supports measurements for L1/L2 based mobility when a target reference signal is outside of an active bandwidth part (BWP) of the UE or iii) whether UE supports inter-frequency measurements for L1/L2 based mobility.

18. The processor of claim 16, wherein the capability information indicates whether the UE supports measurement gap sharing between measurements for L1/L2 based mobility and measurements for L3 based mobility.

19. A user equipment (UE), comprising:
a transceiver configured to communicate with a network; and
a processor communicatively coupled to the transceiver and configured to perform operations, comprising:
determining a measurement gap sharing scheme for layer 1 (L1)/layer 2 (L2) based mobility and layer 3 (L3) based mobility, wherein the measurement gap scheme includes measurement gap sharing between an intra-frequency measurement category and an inter-frequency measurement category, wherein the inter-frequency measurement category includes sharing a measurement gap between at least L1-reference signal received power (RSRP) and layer 3 (L3) measurements;
determining a measurement gap pattern, wherein at least one measurement gap includes L1/L2 measurement occasions and L3 measurement occasions; and
collecting measurement data during the at least one measurement gap in accordance with the measurement gap sharing scheme.

20. The base station of claim 19, wherein the intra-frequency measurement category includes intra-frequency measurements for L1/L2 based mobility and intra-frequency measurements for L3 based mobility and wherein target carriers for measurement equally share measurement occasions across the measurement gap pattern.

* * * * *